United States Patent
Yun et al.

(10) Patent No.: US 11,233,750 B2
(45) Date of Patent: Jan. 25, 2022

(54) METHOD AND APPARATUS FOR ALLOCATING TRANSMISSION OPPORTUNITIES IN VEHICLE NETWORK

(71) Applicants: Hyundai Motor Company, Seoul (KR); Kia Motors Corporation, Seoul (KR); Industry-University Cooperation Foundation Hanyang University, Seoul (KR)

(72) Inventors: Jin Hwa Yun, Seoul (KR); Dong Ok Kim, Gyeonggi-do (KR); Byung Joo Kim, Seoul (KR); Sung Kwon Park, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 290 days.

(21) Appl. No.: 16/665,844

(22) Filed: Oct. 28, 2019

(65) Prior Publication Data

US 2020/0136993 A1 Apr. 30, 2020

Related U.S. Application Data

(60) Provisional application No. 62/752,161, filed on Oct. 29, 2018.

(30) Foreign Application Priority Data

Oct. 23, 2019 (KR) .................. 10-2019-0132546

(51) Int. Cl.
*H04L 12/911* (2013.01)
*H04L 29/08* (2006.01)

(52) U.S. Cl.
CPC .......... *H04L 47/821* (2013.01); *H04L 47/826* (2013.01); *H04L 67/12* (2013.01); *H04L 69/323* (2013.01)

(58) Field of Classification Search
CPC ..................................... H04L 47/821
See application file for complete search history.

(56) References Cited

U.S. PATENT DOCUMENTS

2019/0363991 A1* 11/2019 Sostawa ................ H04L 47/225

OTHER PUBLICATIONS

LAN/MAN Standards Committee of the IEEE Computer Society, "Draft Standard for Ethernet Amendment: Physical Layer Specifications and Management Parameters for 10 Mb/s Operation over Single Balanced Twisted-pair Cabling and Associated Power Delivery", IEEE P802.3cg/D1.1, Feb. 12, 2018; 184 p.

* cited by examiner

*Primary Examiner* — Kodzovi Acolatse
*Assistant Examiner* — Abdeltif Ajid
(74) *Attorney, Agent, or Firm* — Mintz Levin Cohn Ferris Glovsky and Popeo, P.C.; Peter F. Corless

(57) ABSTRACT

An operation method of a first end node constituting an Ethernet-based vehicle network includes receiving a first beacon from a second end node, the beacon including first configuration information of a first main-cycle including a plurality of sub-cycles each of which includes N time slots; transmitting a signal in a time slot corresponding to an identifier of the first end node among the N time slots within a sub-cycle #k of the plurality of sub-cycles; and transmitting a signal in a time slot corresponding to the identifier of the first end node among the N time slots in a sub-cycle #(k+1) consecutive with the sub-cycle #k of the plurality of sub-cycles.

20 Claims, 15 Drawing Sheets

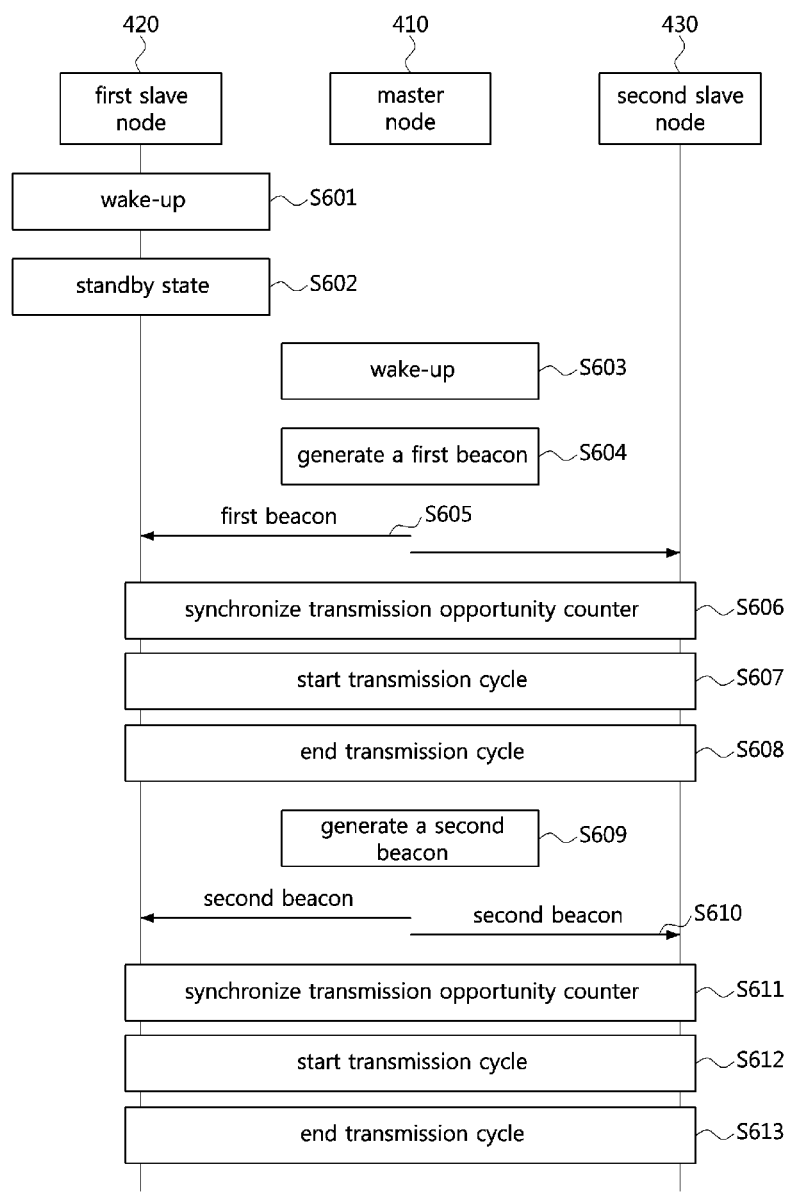

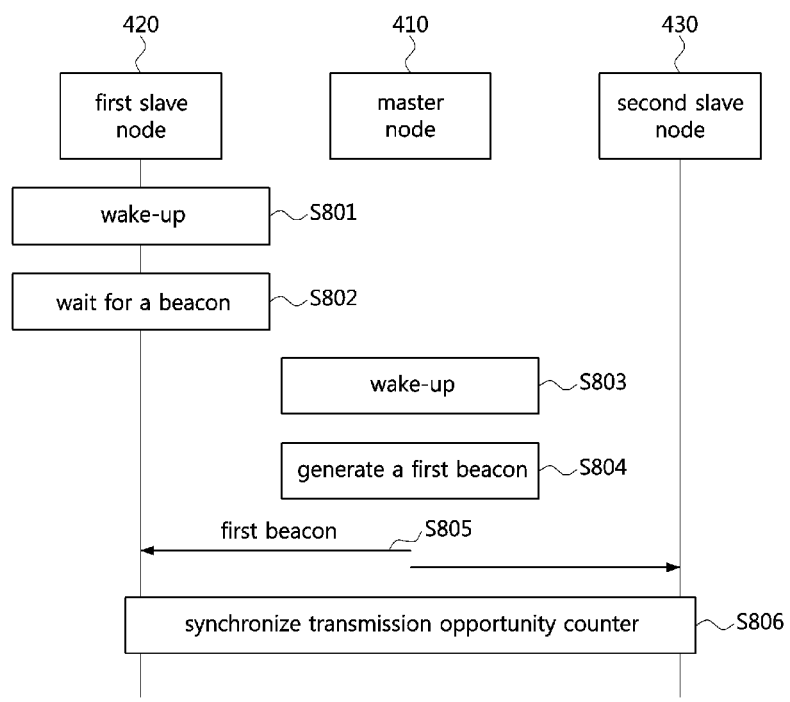

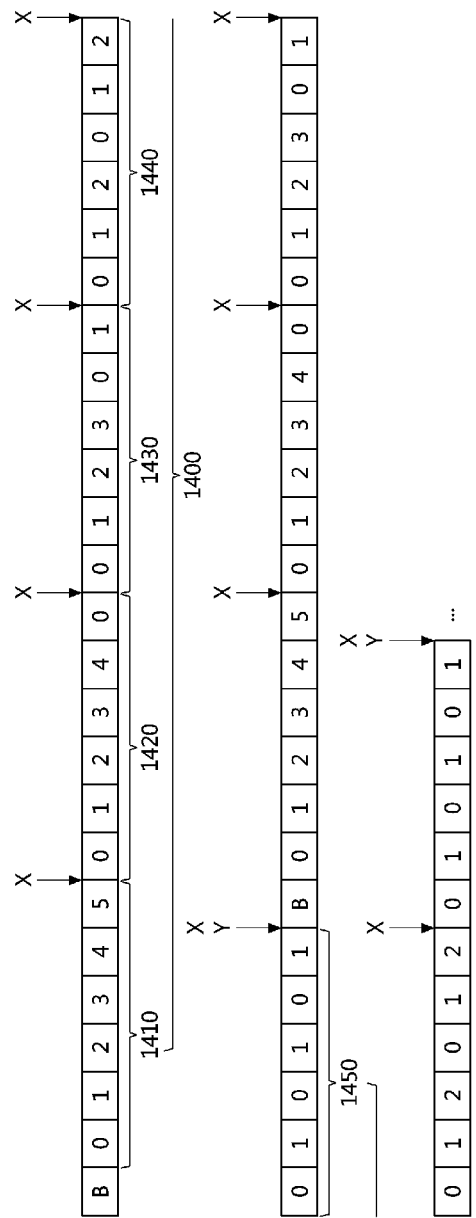

METHOD AND APPARATUS FOR ALLOCATING TRANSMISSION OPPORTUNITIES IN VEHICLE NETWORK

CROSS-REFERENCE TO RELATED APPLICATION

This application claims the benefit of priority to U.S. Patent Application No. 62/752,161, filed on Oct. 29, 2018 in the U.S. Patent and Trademark Office, and Korean Patent Application No. 10-2019-0132546, filed on Oct. 23, 2019 in the Korean Intellectual Property Office (KIPO), the entire contents of which are incorporated herein by reference.

BACKGROUND

(a) Technical Field

The present disclosure relates to communications technology in a vehicle network, more particularly, to an operation method of an end node in the vehicle network including an Ethernet-based network and an apparatus for the same.

(b) Description of the Related Art

The number and variety of devices installed in vehicles have increased significantly in accordance with the recent digitalization of vehicle parts. Generally, electronic devices may be used throughout vehicles, including a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

One of the Ethernet protocols that a vehicle network can support may be 10 single pair Ethernet (SPE). In case of a 10SPE network to which a plurality of nodes are connected, when a plurality of end nodes want to simultaneously transmit data packets to other end nodes, collision may occur between the different data packets in a PHY layer. The plurality of end nodes connected to the 10SPE network may use a PHY layer collision avoidance (PLCA) function to avoid the collision in the PHY layer. The PLCA function refers to a function of sequentially granting transmission opportunities for transmitting data packets to the plurality of end nodes connected to the 10SPE network. The PLCA function can provide improved performance in a multi-drop Ethernet network with fewer nodes (less than 16 nodes) through a low propagation delay.

Meanwhile, the current PLCA function uses a round-robin scheduling algorithm to ensure fairness. In this case, fairness can be ensured because all nodes in the PHY layer are provided with transmission opportunities. However, in case of an in-vehicle network (IVN) where emergency data should be transmitted and received (e.g., a situation where a brake or an airbag should be operated), it may be difficult to apply the current PLCA function as it is.

SUMMARY

The present disclosure provides a method and an apparatus for making an end node with a higher priority have an additional transmission opportunity.

In accordance with an exemplary embodiment of the present disclosure, an operation method of a first end node constituting an Ethernet-based vehicle network may comprise receiving a first beacon from a second end node, the beacon including first configuration information of a first main-cycle including a plurality of sub-cycles each of which includes N time slots; transmitting a signal in a time slot corresponding to an identifier of the first end node among the N time slots within a sub-cycle #k of the plurality of sub-cycles; and transmitting a signal in a time slot corresponding to the identifier of the first end node among the N time slots in a sub-cycle #(k+1) consecutive with the sub-cycle #k of the plurality of sub-cycles, wherein a number of end nodes having transmission opportunity in the sub-cycle #k is greater than a number of end nodes having transmission opportunity in the sub-cycle #(k+1), N is a natural number equal to or greater than 2, and K is a natural number equal to or greater than 1.

The end node having a plurality of transmission opportunities may be an end node having a high transmission priority.

The first beacon may include identifiers of end nodes performing signal transmission in the N time slots, and a transmission priority of each of the end nodes may be determined according to the identifier of the each of the end nodes.

The first beacon may further include information indicating a maximum length of the time slot, and the signal may be transmitted within the maximum length indicated by the first beacon.

The first beacon may further include information indicating a period for which the first configuration information of the first main-cycle is valid, and the period may correspond to one or more beacon intervals.

The operation method may further comprise, when the first main-cycle ends, receiving a second beacon from the second end node, the second beacon including second configuration information of a second main-cycle including a plurality of sub-cycles each of which includes M time slots, wherein M is a natural number different from N.

Each of one or more end nodes has a plurality of transmission opportunities in the sub-cycle #(k+1). When a time slot configured for the first end node is not present in the N time slots in a sub-cycle #(k+2) consecutive with the sub-cycle #(k+1) among the plurality of sub-cycles, the first end node may not transmit a signal in the sub-cycle #(k+2).

In accordance with another exemplary embodiment of the present disclosure, an operation method of a second end node constituting an Ethernet-based vehicle network may comprise generating first configuration information of a first main-cycle including a plurality of sub-cycles each of which includes N time slots; transmitting a first beacon including the first configuration information of the first main-cycle; and receiving a signal from one or more end nodes in the N time slots included in each of the plurality of sub-cycles, wherein a number of end nodes having transmission opportunity in a sub-cycle #k is greater than a number of end nodes having transmission opportunity in a sub-cycle #(k+1), N is a natural number equal to or greater than 2, and K is a natural number equal to or greater than 1.

The first beacon may further include information indicating a maximum length of the time slot, and the signal may be transmitted within the maximum length indicated by the first beacon.

The first beacon may further include information indicating a period for which the first configuration information of the first main-cycle is valid, and the period may correspond to one or more beacon intervals.

The operation method may further comprise, when the first main-cycle ends, generating a second beacon including second configuration information of a second main-cycle including a plurality of sub-cycles each of which includes M time slots; and transmitting the second beacon including the second configuration information of the second main-cycle, wherein M is a natural number different from N.

In accordance with still another embodiment of the present disclosure, a first end node constituting an Ethernet-based vehicle network may comprise a physical (PHY) layer unit including a PHY layer processor; a controller unit including a controller processor; and a memory storing at least one instruction executable by the PHY layer unit and the controller unit. When executed by the PHY layer unit and the controller unit, the at least one instruction may be configured the PHY layer unit and the controller unit to receive a first beacon from a second end node, the beacon including first configuration information of a first main-cycle including a plurality of sub-cycles each of which includes N time slots; transmit a signal in a time slot corresponding to an identifier of the first end node among the N time slots within a sub-cycle #k of the plurality of sub-cycles; and transmit a signal in a time slot corresponding to the identifier of the first end node among the N time slots in a sub-cycle #(k+1) consecutive with the sub-cycle #k of the plurality of sub-cycles, wherein a number of end nodes having transmission opportunity in the sub-cycle #k is greater than a number of end nodes having transmission opportunity in the sub-cycle #(k+1), N is a natural number equal to or greater than 2, and K is a natural number equal to or greater than 1.

The end node having a plurality of transmission opportunities may be an end node having a high transmission priority.

The first beacon may include identifiers of end nodes performing signal transmission in the N time slots, and a transmission priority of each of the end nodes may be determined according to the identifier of the each of the end nodes.

The first beacon may further include information indicating a maximum length of the time slot, and the signal may be transmitted within the maximum length indicated by the first beacon.

The first beacon may further include information indicating a period for which the first configuration information of the first main-cycle is valid, and the period may correspond to one or more beacon intervals.

The at least one instruction may be further configured the PHY layer unit and the controller unit to, when the first main-cycle ends, receive a second beacon from the second end node, the second beacon including second configuration information of a second main-cycle including a plurality of sub-cycles each of which includes M time slots, wherein M is a natural number different from N.

Each of one or more end nodes has a plurality of transmission opportunities in the sub-cycle #(k+1).

When a time slot configured for the first end node is not present in the N time slots in a sub-cycle #(k+2) consecutive with the sub-cycle #(k+1) among the plurality of sub-cycles, the first end node may not transmit a signal in the sub-cycle #(k+2).

According to the exemplary embodiments of the present disclosure, in an Ethernet-based (e.g., 10SPE) network environment, a high priority end node (e.g., brake, airbag, or the like) may have more transmission opportunities. Through this, communication reliability in communication between end nodes can be improved, and the performance of the vehicle network can be improved.

However, effects of the method and apparatus for allocating transmission opportunities in the vehicle network according to the exemplary embodiments of the present disclosure are not limited to those mentioned above. Other effects not mentioned will be clearly understood by those skilled in the art from the following description.

BRIEF DESCRIPTION OF DRAWINGS

Exemplary embodiments of the present disclosure will become more apparent by describing in detail forms of the present disclosure with reference to the accompanying drawings, in which:

FIG. 6 is a sequence chart illustrating a first exemplary embodiment of an operation method of end nodes belonging to a vehicle network;

FIGS. 8B and 8C are sequence charts illustrating an operation method of end nodes according to the second exemplary embodiment; and FIGS. 9 to 14 are conceptual charts illustrating cases where the number of end nodes is 1, 2, 3, 4, 5, and 6 in the transmission cycles for the end nodes according to the second exemplary embodiment.

Figure 1:
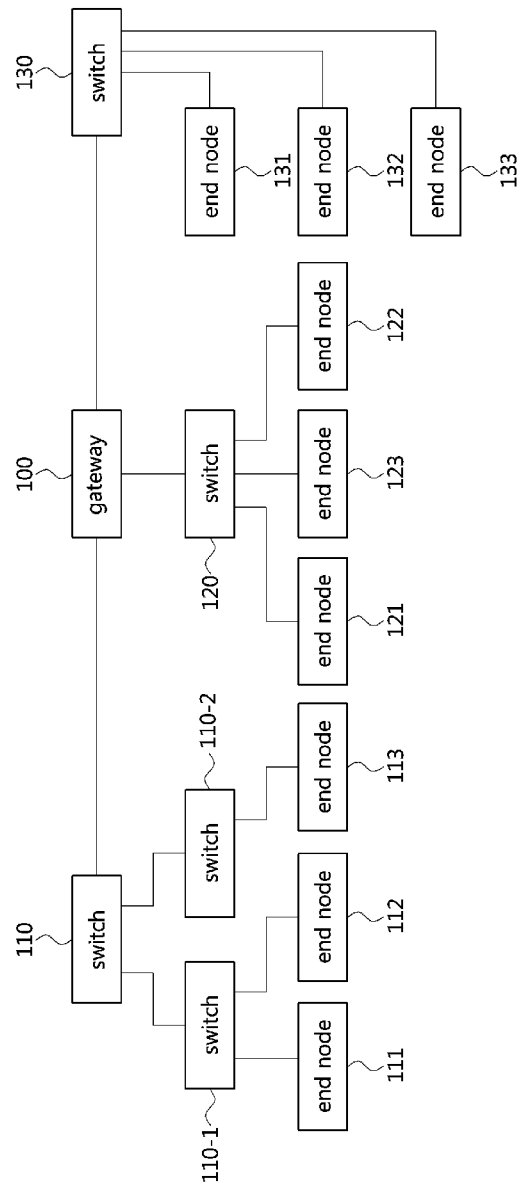
FIG. 1 is a block diagram illustrating a first exemplary embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology.

As shown in FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and control at least one of the end nodes 111, 112, 113, 121, 122, 123, 124, 125, 131, 132, and 133 connected to the switch.

Each of the end nodes 111, 112, 113, 121, 122, 123, 124, 125, 131, 132, and 133 may include an electronic control unit (ECU) configured to control various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

The communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. The exemplary embodiments according to the present disclosure may be applied to the network topology described above, the network topology to which the exemplary embodiments according to the present disclosure is applied may be variously configured without being restricted the above-described network topology.

Figure 2:
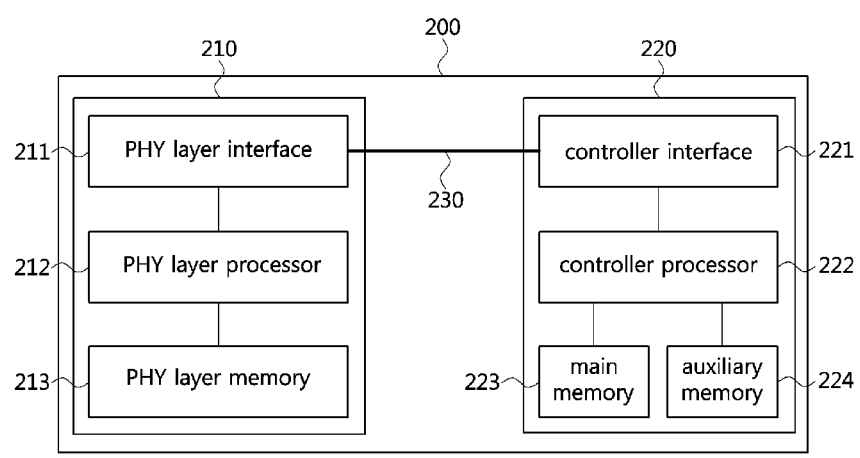
FIG. 2 is a block diagram illustrating a first exemplary embodiment of a communication node belonging to a vehicle network.

FIG. 2 is a block diagram illustrating a first exemplary embodiment of a communication node belonging to a vehicle network.

As shown in FIG. 2, a communication node 200 constituting a vehicle network may include a physical (PHY) layer unit 210 and a controller unit 220. The communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface 221, a controller processor 222, a main memory 223, and an auxiliary memory 224. The controller processor 222 is an electric circuitry which performs various functions described below. The configuration of the controller unit 220 is not limited thereto, and the controller 220 may be configured in various ways. The controller interface 221 may be configured to receive a signal from the PHY layer unit 210 (e.g., the PHY layer interface 211) or an upper layer (not shown), transmit the received signal to the controller processor 222, and transmit the signal received from the controller processor 222 to the PHY layer unit 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
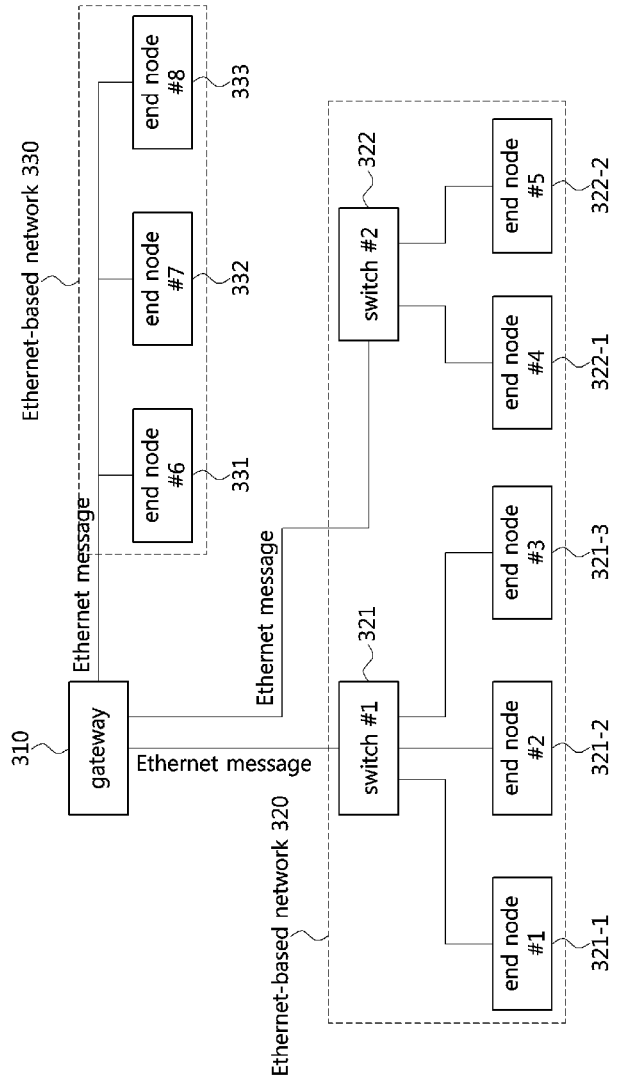
FIG. 3 is a block diagram illustrating a second exemplary embodiment of a vehicle network topology.
Figure 4:
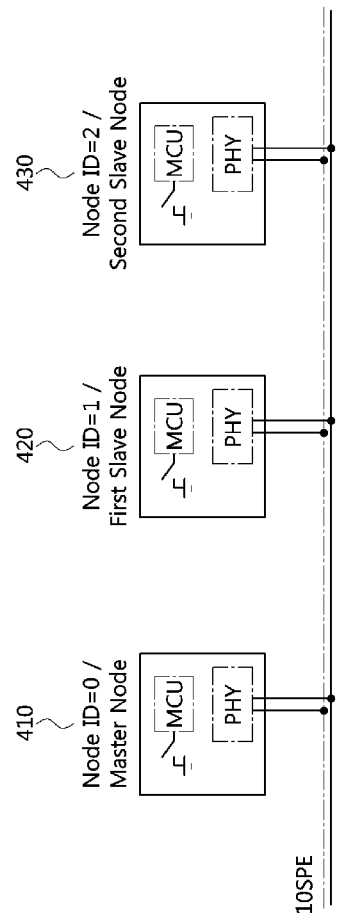
FIG. 4 is a block diagram illustrating an exemplary embodiment of a 10SPE network.

FIG. 3 is a block diagram illustrating a second exemplary embodiment of a vehicle network topology, and FIG. 4 is a block diagram illustrating an exemplary embodiment of a 10SPE network.

As shown in FIG. 3, a vehicle network may include a plurality of Ethernet based networks 320 and 330. A gateway 310 belonging to the vehicle network may support Ethernet-based network communication. The Ethernet-based networks may include a switch #1 321, a switch #2 322, an end node #1 321-1, an end node #2 321-2, an end node #3 321-3, an end node #4 322-1, an end node #5 322-1, an end node #6 331, an end node #7 332, an end node #8 333, and the like. The end node #1 321-1, the end node #2 321-2, and the end node #3 323-1 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333, which are connected by a 10SPE network scheme, may be connected to the gateway 310 through a bus or a single pair of wires.

Messages based on the Ethernet protocol may be referred to as 'Ethernet messages', and the Ethernet messages may be referred to also as 'Ethernet frames', 'Ethernet signals', 'Ethernet packets', or the like. The end nodes 321, 321-1, 321-2, 321-3, 322, 322-1, 322-2, 331, 332, and 333, which are part of the Ethernet-based network, may communicate using Ethernet messages. Communication between the Ethernet-based networks and the gateway 310 may also be performed using Ethernet messages.

As shown in FIG. 4, the end nodes constituting the 10SPE network may be configured with a master-slave relationship. For example, one end node 410 of the end nodes constituting the vehicle network may be a master node, and the remaining nodes 420 and 430 except the master node 410 may be slave nodes. The master node 410 and slave nodes 420 and 430 may operate in a sleep state, and when a local wake-up signal or a remote wake-up signal is received, an operation state of each of the master node 410 and the slave nodes 420 and 430 may transition from the sleep state to a wake-up state.

The master node 410 and the slave nodes 420 and 430 constituting the 10SPE network may refer to electronic control units (ECUs) controlling various devices included in the vehicle. Each of the end nodes constituting the vehicle network may support the Ethernet protocol.

The master node 410 and slave nodes 420 and 430 may be connected in a bus topology. The master node 410 and the slave nodes 420 and 430 may be connected in a power over data lines (PoDL) scheme through a pair of wires. The pair of wires may be wires for supply power to the end node or transferring data packets between the end nodes.

The master node 410 among the end nodes constituting the 10SPE network may supply a signal and power to wake up the other slave nodes 420 and 430 through a pair of wires. Then, the master node 410 may communicate with the slave nodes 420 and 430 through a pair of wires. The slave nodes 420 and 430 may receive the signal from the master node 410 through a pair of wires, and may transmit and receive data packets with other nodes through a pair of wires.

When a plurality of end nodes connected to the 10SPE network desire to simultaneously transmit data packets to other end nodes, collisions between different data packets may occur in the PHY layer. A plurality of end nodes connected to the 10SPE network may use a PHY layer collision avoidance (PLCA) function to avoid collision in the PHY layer. That is, the PLCA function may be a function of sequentially granting a transmission opportunity for transmitting a data packet to a plurality of end nodes connected to the 10SPE network.

Figure 5:
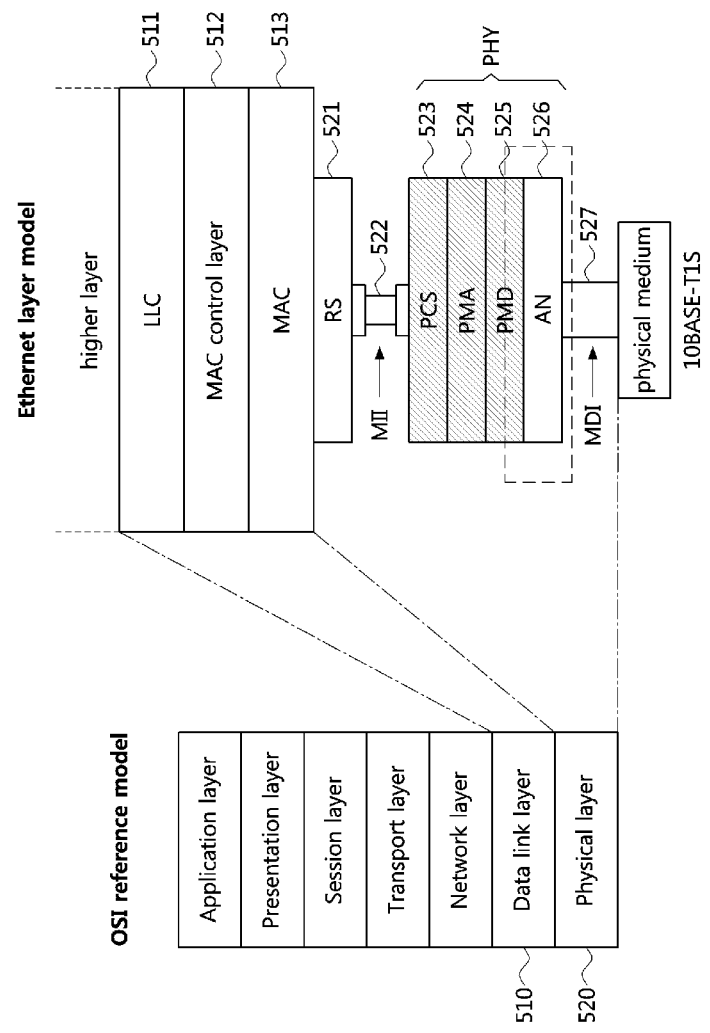
FIG. 5 is a conceptual diagram illustrating an Ethernet layer model.

FIG. 5 is a conceptual diagram illustrating an Ethernet layer model.

As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or other MAC client sublayer 511, a MAC control sublayer 512, and a MAC sublayer 513.

The MAC layer of the Ethernet layer model may be connected to the PHY layer through a reconciliation sublayer (RS) 521 and an MII sublayer 522. The RS 521 and the MII sublayer 522 of the Ethernet layer model may correspond to a PHY layer 520 of the OSI reference model. The RS 521 may perform a function of adjusting logical signal mapping between the MAC sublayer 513 and a PCS 523 to be described later.

The RS 521 may be a sublayer supporting the PCLA function between the MAC layer and the PHY layer connected through the MII sublayer 522. The RS 521 may adjust mapping of signals between the MAC sublayer and the PCS 523 during a predetermined time slot to prevent collision in the PHY layer due to transmission of frames.

The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526.

The PCS 523 may obtain data from the MAC layer, and perform line coding on the data based on a protocol of the network (e.g., a transmission speed, etc.). The PCS 523 may transfer the data generated as a result of the line encoding to the PMA sublayer 524.

The PMA sublayer 524 may obtain the data generated as a result of the line encoding from the PCS 523, and may convert the obtained data into a physical signal. The PMA sublayer 524 may transfer the data converted into the physical signal to the PMD sublayer 525. The PMD sublayer 525 may obtain the data converted into the physical signal from the PMA sublayer 524, and may convert the obtained physical signal to be suitable for a physical medium connected to the PHY layer.

The AN sublayer 526 may be a sublayer that configures an optimal transmission scheme between end nodes transmitting signals among a plurality of transmission schemes. The AN sublayer 526 may determine one signal transmission scheme by performing negotiation with other end nodes based on a plurality of signal transmission schemes. In addition, the AN sublayer 526 may determine master-slave relationship of the plurality of end nodes. For example, when receiving a signal from another end node, the AN sublayer 526 may determine whether the end node transmitting the signal is a master node or a slave node.

The PHY layer of the Ethernet layer model may be connected to a physical medium through a medium dependent interface (MDI) 527. The MDI 527 may receive the physical signal from the PMD sublayer 525 and transmit the signal through the physical medium. The MDI 527 of the Ethernet layer model may correspond to the PHY layer 520 of the OSI reference model.

Hereinafter, a method performed at an end node belonging to a vehicle network and a method performed at a corresponding counterpart end node will be described. Even when a method (e.g., transmission or reception of a signal) to be performed at a first end node is described, a corresponding second end node may perform a method (e.g., reception or transmission of the signal) corresponding to the method performed at the first end node. That is, when an operation of the first end node is described, the corresponding second end node may perform an operation corresponding to the operation of the first end node. Conversely, when an operation of the second end node is described, the corresponding first end node may perform an operation corresponding to the operation of the second end node.

Here, each of a plurality of end nodes may perform the following operations through at least one instruction stored in the memory.

FIG. 6 is a sequence chart illustrating a first exemplary embodiment of an operation method of end nodes belonging to a vehicle network.

As shown in FIG. 6, each of a plurality of end nodes 410, 420, and 430 may be connected to an Ethernet-based vehicle network. In the Ethernet-based vehicle network, each of the end nodes may be a master node or a slave node. Specifically, the end nodes may be classified into one master node and a plurality of slave nodes.

A PHY layer unit of each of the end nodes 410, 420, and 430 may have a PHY identifier (ID) which is a unique identifier. The PHY IDs of the end nodes 410, 420, and 430 may determine master-slave relationship between the end nodes 410, 420, and 430. For example, an end node having a PHY ID of 0 may be determined as a master node (e.g., the end node 410), and an end node whose PHY ID is not 0 may be determined as a slave node (e.g., the end node 420 or 430).

A controller unit of an end node that detects an event from the outside among the plurality of end nodes may transition its operation state from a sleep state to a wake-up state. The woken-up controller unit may wake up a PHY layer unit connected with the controller unit. The PHY layer unit of the woken-up end node (i.e., one of the master node 410 and the slave nodes 420 and 430) may determine and perform an operation after the wake-up according to the master-slave relationship of the end node (i.e., whether the end node is a master node or a slave node).

The end node 420 waking up in the step S601 may be a slave node whose PHY ID is not 0. The controller unit of the slave node 420 waking up by detecting a local event may wake up its PHY layer unit. Then, the slave node 420 that does not receive a beacon from the master node 410 may maintain a standby state until receiving the beacon from the master node 410 (S602). If the slave node 420 does not receive the beacon, the slave node 420 may maintain the standby state until the master node 410 wakes up and transmits the beacon (S602).

The end node waking up in the step S603 may be a master node having a PHY ID of 0. The controller unit of the master node 410 that has detected an event may wake up its PHY layer unit by transmitting a wake-up signal to the PHY layer unit of the master node 410. The PHY layer unit of the master node 410 may receive the wake-up signal and wake up (S603).

The master node 410 waking up in the step S603 may start a beacon timer and generate a beacon (S604). The beacon generated immediately after the master node 410 wakes up in the S603 (S604) may be referred to as a first beacon. The master node 410 may transmit the first beacon generated in the S604 to the slave nodes 420 and 430 connected to the network (S605)

The slave nodes 420 and 430 may receive the first beacon from the master node 410 (S605), and the slave node 420 receiving the first beacon from the master node 410 may synchronize its transmission opportunity counter included in the slave node 402 (S606).

Each of the PHY layer units of the slave nodes 420 and 430 may identify its transmission opportunity counter in order to determine whether a data packet transmission opportunity is granted to itself. The PHY layer unit of each of the slave nodes 420 and 430 may determine whether a transmission opportunity is granted to each of the slave nodes 420 and 430 based on the identified transmission opportunity counter.

When the slave nodes 420 and 430 receive the first beacon from the master node 410 and synchronize their transmission opportunity counters, the transmission opportunity counters of the end nodes 410, 420 and 430 may be set to 0 (S606). After the transmission opportunity counters of the master node 410 and the slave nodes 420 and 430 are synchronized, the master node 410 may stop the beacon timer. When transmission and reception of a beacon of an end node (or the first beacon) is completed, a transmission cycle (or, bus cycle) in which the end nodes 410, 420, and 430 connected to the network can transmit data packets may be started (S607).

Figure 7A:
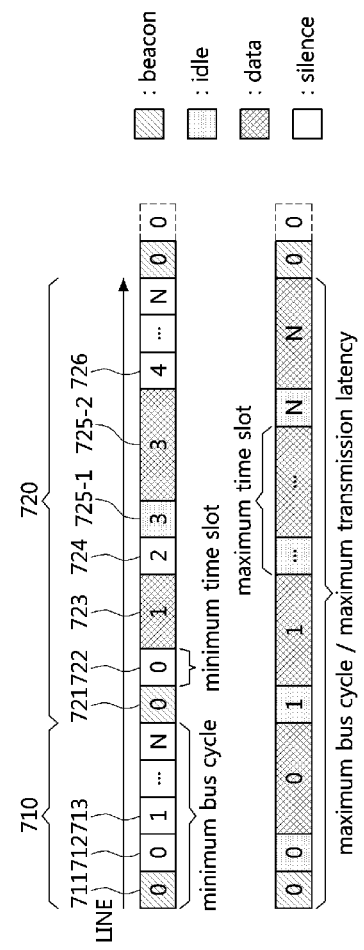
FIG. 7A is a conceptual diagram illustrating transmission cycles for end nodes according to a first exemplary embodiment.

FIG. 7A is a conceptual diagram illustrating transmission cycles for end nodes according to a first exemplary embodiment.

As shown in FIG. 7A, one transmission cycle may be composed of a plurality of time slots. The first time slot of the transmission cycle may be a time slot after a time slot 711 in which a master node transmits a beacon. When one master node 410 and N slave nodes (e.g., 420 and 430) are connected to the vehicle network, one transmission cycle may include the time slot 712 in which the master node 410 may transmit data and N time slots starting from a time slot 713, in which the N slave nodes may transmit data, and thus the one transmission cycle may include a total of (N+1) time slots. In one time slot, one end node may acquire a data packet transmission opportunity. The end node that has acquired the data packet transmission opportunity may transmit a data packet to another node in the corresponding time slot.

The lengths of the remaining time slots except the first time slot 711 in which the beacon is transmitted may vary depending on the operation of the end node that has acquired the transmission opportunity. For example, each of the time slots 712, 713, 722, and 724 without a data transmission operation of the corresponding end node for a preconfigured time may be a 'silence slot'. The time slot 725-1 in which the corresponding end node fails to perform a transmission operation due to a transmission latency after the starting time point of the corresponding time slot may be an 'idle slot'. Each of the time slots 723 and 725-2 in which the corresponding end node transmits data to other end nodes may be a 'data slot', and the length of each of the data slots 723 and 725-2 may be proportional to the length of data transmitted by the corresponding end node. The length of the transmission period may vary depending on the lengths of time slots included in the transmission cycle.

Figure 7B:
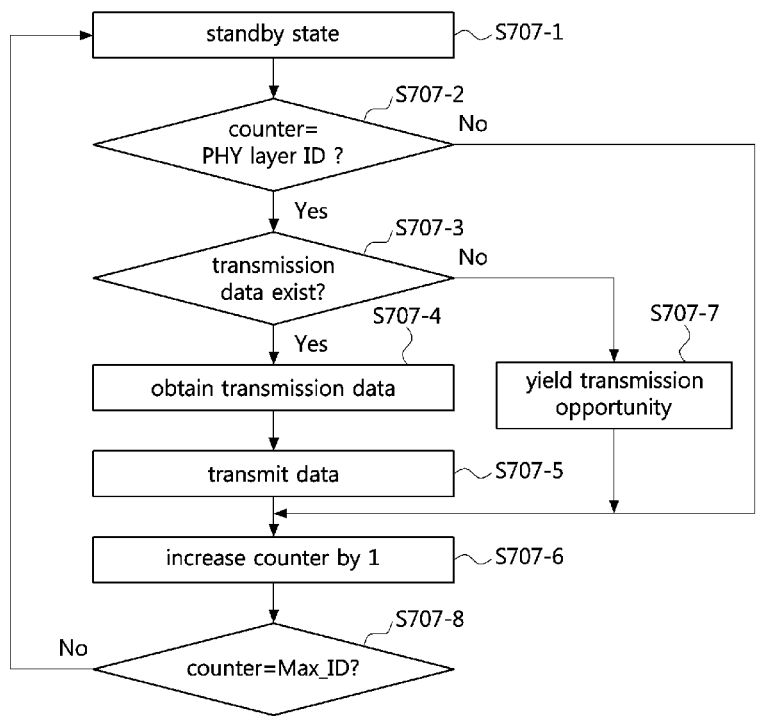
FIG. 7B is a flow chart illustrating an exemplary embodiment of a transmission operation method of an end node during the transmission cycle according to the first exemplary embodiment of FIG. 7A.

FIG. 7B is a flow chart illustrating an exemplary embodiment of a transmission operation method of an end node during the transmission cycle according to the first exemplary embodiment of FIG. 7A.

As shown in FIG. 7B, when a transmission cycle is started, the end nodes 410, 420, and 430 may maintain a standby state (S707-1). When a collision between two or more data packets is detected in a PHY layer, the master node 410 may terminate the transmission cycle and generate a beacon again. The master node 410 may transmit the regenerated beacon, and the slave nodes 420 and 430 may receive the beacon from the master node 410. Upon receiving the beacon, the slave nodes 420 and 430 may resynchronize their transmission opportunity counters.

Each of the end nodes 410, 420, and 430 may determine whether a transmission opportunity is granted based on its transmission opportunity counter (S707-2). A PHY layer unit of the end node may compare its transmission opportunity counter with a PHY ID of the end node (S707-2). The transmission opportunity counter may be equal to the index of the time slot of the transmission cycle.

End nodes with PHY IDs different from the number indicated by the transmission opportunity counter may not acquire a data transmission opportunity, and the PHY layer units of the end nodes may maintain a standby state for a preconfigured time. After the preconfigured time elapses, the PHY layer units of the end nodes that do not acquire the transmission opportunity may increase the number of their transmission opportunity counters by 1 (S707-6).

The PHY layer unit of the end node having the same PHY ID as the number indicated by the transmission opportunity counter may acquire an opportunity to transmit data. The end node granted the data transmission opportunity may determine whether there is a data packet to be transmitted to other end nodes (S707-3). A controller unit of the end node may determine whether there is a data packet to be transmitted to other end nodes (S707-3). The controller unit of the end node may transmit a data packet to be transmitted to other end nodes to the PHY layer unit (S707-4).

The PHY layer unit of the end node that has acquired the transmission opportunity may transmit the data packet obtained from the controller unit of the end node to other end nodes connected to the vehicle network (S707-5). The PHY layer unit of the end node that has completed the data packet transmission may terminate the transmission opportunity. When the data transmission operation is completed, the PHY layer units of the end nodes may increase their transmission opportunity counters by 1 (707-6).

The PHY layer unit of the end node acquiring the transmission opportunity but having no data packet to transmit to other end nodes (e.g., an end node having not obtained a data packet from the controller unit) may yield the data transmission opportunity to another end node (S707-7). After a preconfigured time elapses, the PHY layer unit of the end node performing the operation of yielding the transmission opportunity may terminate the data packet transmission procedure by terminating the transmission opportunity. When the data packet transmission procedure ends, the PHY layer units of the end nodes connected to the network may increase their transmission opportunity counters by 1 (S707-6).

An initial value of the transmission opportunity counter may be set to 0, and the maximum value of the transmission opportunity counter may be one smaller than the number of end nodes existing in the communication network, which may be referred to as Max_ID. Accordingly, when one master node 410 and N slave nodes (e.g., 420 and 430) are connected to the network, data transmission opportunities may be given to sequentially from the master node 410 having a PHY layer ID of 0 to the slave node having a PHY layer ID of N. In addition, the end node that sequentially acquires the data transmission opportunity may transmit data to other nodes. The end nodes connected to the network may repeat the data transmission operation or the standby operation until the transmission opportunity counter becomes Max_ID.

The master node may compare the preconfigured Max_ID with the transmission opportunity counter of the node (S707-8). When the transmission opportunity counter is not equal to Max_ID, the PHY layer unit of the end node having the same PHY ID as the number of incremented transmission opportunity counters may acquire a data transmission opportunity. When the transmission opportunity counter is equal to Max_ID, the first transmission cycle may end (S708).

Referring back to FIG. 6, after the first transmission cycle ends, the master node 410 may generate a beacon (S610). The beacon generated after the end of the first transmission cycle may be referred to as a second beacon. The master node 410 may transmit the second beacon generated in the step S610 to the other slave nodes 420 and 430 connected to the network (S611).

The PHY layer units of the slave nodes 420 and 430 may receive the second beacon signal from the master node 410 (S610). The slave nodes 420 and 430 may synchronize their transmission opportunity counters based on the received second beacon (S611). As a result of the synchronization operation, the PHY layer units of the master node 410 and the slave nodes 420 and 430 connected to the network may set their transmission opportunity counters to 0 so as to synchronize their transmission opportunity counters (S611).

When a beacon timer of the master node 410 is expired and a beacon of the end node (or, the second beacon) is transmitted and received, a new transmission cycle may start (S612). Even after the transmission cycle in the step S612 ends (S613), the master node 410 and the slave nodes 420 and 430 connected to the network may repeat transmission cycles.

Figure 8A:
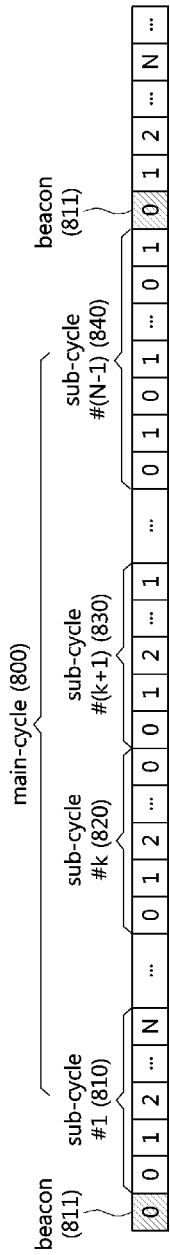
FIG. 8A is a conceptual diagram illustrating transmission cycles for end nodes according to a second exemplary embodiment.
Figure 8C:
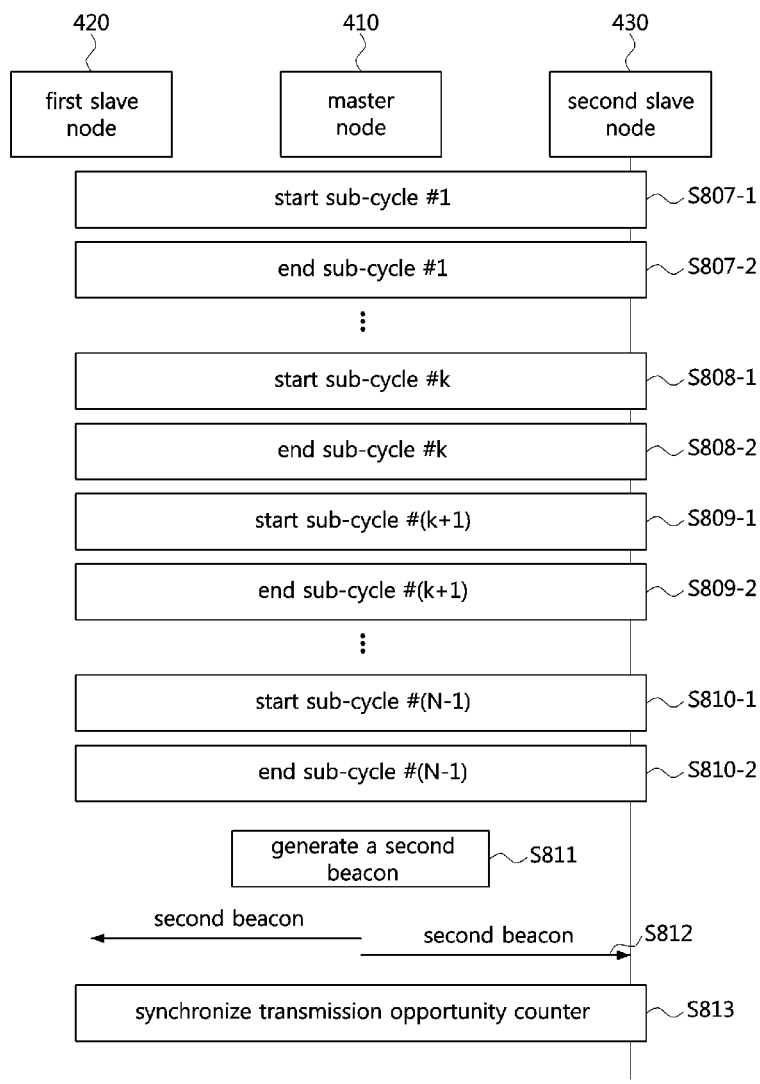

FIG. 8A is a conceptual diagram illustrating transmission cycles for end nodes according to a second exemplary embodiment, and FIGS. 8B and 8C are sequence charts illustrating an operation method of end nodes according to the second exemplary embodiment.

As shown in FIG. 8A, one transmission cycle may be composed of a plurality of time slots. The first time slot of the transmission cycle may be a time slot after a time slot 811 in which a master node transmits a beacon. In one time slot, one end node may acquire a data packet transmission opportunity. The end node that has acquired the data packet transmission opportunity may transmit a data packet to another node. The lengths of the remaining time slots except the first time slot 811 in which the beacon is transmitted may vary depending on the operation of the end node that has acquired the transmission opportunity.

When one master node 410 and N slave nodes (e.g., 420 and 430) are connected to the vehicle network, a transmission opportunity may be additionally given to an end node having a high importance according to the second exemplary embodiment. The smaller the PHY ID value assigned to the end node, the higher the importance of the end node, and the higher importance end node may be connected to a brake, an airbag, or the like.

According to the second exemplary embodiment, a transmission cycle may be configured based on a main-cycle comprising a plurality of sub-cycles 810, 820, 830, and 840. If there are N nodes on the network, the sub-cycles may have N time slots except the time slot for beacon transmission. The main-cycle may be a cycle in which (N−1) sub-cycles are collected. Thus, a total of N×(N−1) transmission opportunities may be granted to the end nodes by one main-cycle.

Referring to FIGS. 8A, 8B, and 8C, an operating method of end nodes according to the second exemplary embodiment will be described.

As shown in FIGS. 8A, 8B, and 8C, each of the plurality of end nodes 410, 420, and 430 may be connected to an Ethernet-based vehicle network. In the Ethernet based vehicle network, each of the end nodes may be a master node or a slave node. Specifically, the end nodes may be classified into one master node and a plurality of slave nodes.

The PHY layer unit of each of the end nodes 410, 420, and 430 may have a PHY identifier (ID) which is a unique identifier. The PHY IDs of the end nodes 410, 420, and 430 may determine master-slave relationship among the end nodes 410, 420, and 430. For example, an end node having a PHY ID of 0 may be determined as the master node 410, and end nodes whose PHY IDs are not 0 may be determined as the slave nodes 420 and 430.

Among the plurality of end nodes, a controller unit of an end node that detects an event from the outside may transition its operation state from the sleep state to the wake-up state. The woken-up controller unit may wake up a PHY layer unit connected to the controller unit. The PHY layer unit of the woken-up end node (one of the master node 410 and the slave nodes 420 and 430) may determine and perform an operation after the wake-up according to the master-slave relationship among the end nodes.

The end node 420 woken up in the step S801 may be a slave node whose PHY ID is not 0. The controller unit of the slave node 420 waking up by detecting a local event may wake up the PHY layer unit. The slave node 420 which does not receive the beacon from the master node 410 may maintain a standby state until receiving the beacon from the master node 410 (S802). If the woken-up slave node 420 does not receive the beacon, the slave node 420 may maintain the standby state until the master node 410 wakes up and transmits the beacon (S802).

The end node woken up in the step S803 may be a master node having a PHY ID of 0. The controller unit of the master node 410 that has detected an event may transmit a wake-up signal to the PHY layer unit of the master node 410. The PHY layer unit of the master node 410 may receive the wake-up signal and wake up (S803).

The master node 410 woken up in the S803 may start a beacon timer, and generate a beacon (S804). The beacon generated immediately after the master node 410 wakes up in the step S803 may be referred to as a 'first beacon'. The master node 410 may transmit the first beacon generated in the step S804 to the slave nodes 420 and 430 connected to the network (S805). The beacon transmitted to the slave nodes 420 and 430 may include configuration information of the main-cycle including a plurality of sub-cycles each of which is composed of N time slots. In addition, the beacon may further include identifiers of end nodes that perform signal transmission in the time slots, and may further include information indicating a maximum length of the time slot. The signal transmitted by the end node may be transmitted within the maximum length indicated by the beacon. The beacon may further include information indicating a period in which the configuration information of the main-cycle is valid, and the period may correspond to one or more beacon intervals.

The slave nodes 420 and 430 may receive the first beacon from the master node 410 (S805) and may identify the configuration information of the main-cycle included in the beacon. The configuration information of the main-cycle may include information on the number of sub-cycles constituting the main-cycle, information on the number of time slots constituting the sub-cycle, and the like. In addition, the slave node 420 receiving the first beacon from the master node 410 may synchronize its transmission opportunity counter (S806). Each of the end nodes 410, 420, and 430 may determine whether a transmission opportunity is granted based on its transmission opportunity counter. The transmission opportunity counter may be equal to the index of the time slot of the transmission cycle.

In an arbitrary sub-cycle #k of the plurality of sub-cycles constituting the main-cycle, an end node may transmit a signal in a time slot corresponding to an identifier of the end node among the N time slots in the sub-cycle #k (S808-1). Specifically, the end node may acquire a transmission opportunity and transmit a signal in the corresponding time slot when the identifier of the end node corresponds to the index of the time slot. As one exemplary embodiment, the end node may acquire the transmission opportunity when the identifier of the end node and the index of the time slot are equal, and transmit the signal in the corresponding time slot. As another exemplary embodiment, even if the identifier of the end node and the index of the time slot are different, the end node may acquire the transmission opportunity and transmit the signal in the corresponding time slot if the index of the time slot corresponds to the identifier of the end node. This is a scheme in which the first end node transmits a signal in the first time slot of the sub-cycle #k, and the second end node transmits a signal in the second time slot when it is determined that the first end node completes the transmission. In the above-described manner, N end nodes may respectively transmit signals in the corresponding time slots in the sub-cycle #k. When it is determined that communication is completed in the N-th time slot of sub-cycle #k, the end nodes may determine that sub-cycle #k ends and may determine that a sub-cycle #(k+1) is started.

In the sub-cycle #(k+1), the first end node may transmit a signal in a time slot corresponding to the PHY ID of the first end node among the N time slots constituting the sub-cycle #(k+1) (S809-1). Each of the end nodes may determine to have a plurality of transmission opportunities, one transmission opportunity, or no transmission opportunity in the sub-cycle #(k+1). An end node that does not have a transmission opportunity may not transmit a signal in the sub-cycle #(k+1).

Therefore, the number of end nodes having a transmission opportunity in the sub-cycle #k may be larger than the number of end nodes having a transmission opportunity in the sub-cycle #(k+1). This is because at least one end node has multiple transmission opportunities in the sub cycle #(k+1). The end node having a plurality of transmission opportunities may be an end node having a high transmission priority, and the transmission priority may be determined according to the PHY ID. The transmission priority may be higher as the PHY ID of the end node is lower. As one exemplary embodiment, an end node having a plurality of transmission opportunities may be an end node whose PHY ID is 0 or 1. If there is no time slot configured for the lower priority end node among the N time slots in the sub-cycle #(k+2) subsequent to the sub-cycle #(k+1), the lower priority end node may not transmit a signal in the sub-cycle #(k+2). Here, N may be a natural number equal to or greater than 2, and k may be a natural number equal to or greater than 1.

Since the main-cycle is composed of (N−1) sub-cycles, when it is determined that communication is completed in the last sub-cycle #(N−1) belonging to the main-cycle, the end nodes may determine that the sub-cycle #(N−1) ends. That is, the end nodes may determine that the main-cycle ends. In the last sub-cycle #(N−1) belonging to the main-cycle, only an end node having a PHY ID of 0 or 1 may have a transmission opportunity (S810-1).

When the end nodes determine that the main-cycle ends (i.e., when it is determined that the sub-cycle #(N−1) ends, the end nodes may perform a monitoring operation for receiving a beacon. For example, the first end node may receive a beacon including configuration information of a main-cycle including a plurality of sub-cycles each of which includes M time slots from the second end node operating as a master node. The configuration information included in the beacon may be different from the configuration information included in the previous beacon. Here, M may be a natural number different from N. Thereafter, the end nodes may perform communications based on the configuration information included in the beacon, and may perform communications in the same manner as described above. Meanwhile, the beacon may include a signal indicating a start of the main-cycle, so that a total of M×(M−1) transmission opportunities may be granted to the end nodes by the beacon.

FIGS. 9 to 14 are conceptual charts illustrating cases where the number of end nodes is 1, 2, 3, 4, 5, and 6 in the transmission cycles for the end nodes according to the second exemplary embodiment.

Figure 9:
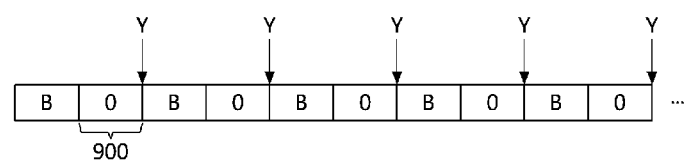

Specifically, FIG. 9 illustrates transmission cycles when the number of end nodes is 1, that is, the number of PHYs is 1. Here, 'B' denotes a beacon, and each number denotes a PHY ID of each end node. As shown in FIG. 9, when the number of end nodes is 1, only an end node having a PHY ID of 0 has a transmission opportunity in the main-cycle 900. When the number of end nodes is 1, the main-cycle 900 may be configured as one sub-cycle. That is, the main-cycle and the sub-cycle may be the same. Therefore, sufficient transmission opportunities are guaranteed to the high priority end node.

Figure 10:
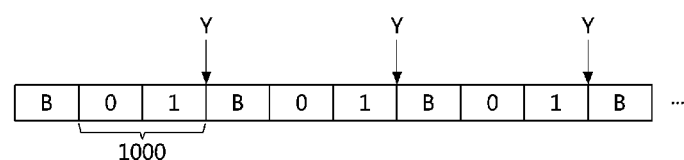

FIG. 10 illustrates transmission cycles when the number of end nodes is 2, that is, the number of PHYs is 2. As shown in FIG. 10, when the number of end nodes is 2, an end node having a PHY ID of 0 or 1 has a transmission opportunity in the main-cycle 1000. When the number of end nodes is 2, the main-cycle 1000 may be configured as one sub-cycle. That is, the main-cycle and the sub-cycle may be the same. Therefore, sufficient transmission opportunities are guaranteed to the high priority end nodes.

Figure 11:
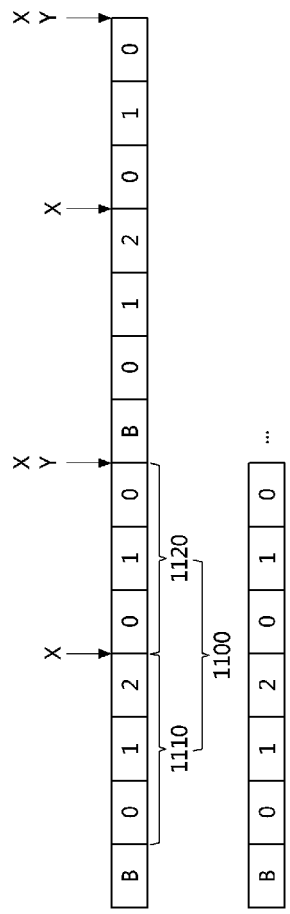

FIG. 11 illustrates transmission cycles when the number of end nodes is 3, that is, the number of PHYs is 3.

As shown in FIG. 11, a main-cycle 1100 starts with transmission of a beacon, and the main-cycle 1100 may include two sub-cycles 1110 and 1120 each of which consists 3 time slots. A total of 6 (=3×(3−1)) transmission opportunities may be granted to end nodes through the main-cycle 1100. In FIG. 11, 'X' denotes a time point at which one sub-cycle 1110 or 1120 ends, and 'Y' denotes a time point at which one main cycle 1100 ends.

In the sub-cycle 1110, three end nodes having PHY IDs of 0, 1, and 2, respectively, may be granted transmission opportunities in order. For example, a PHY ID of the first end node may be 0, a PHY ID of the second end node may be 1, and a PHY ID of the third end node may be 2. The end nodes may receive the beacon from a master node, and may identify configuration information of the main-cycle, which is included in the beacon. Accordingly, the end nodes may determine that the main-cycle 1100 including the two sub-cycles 1110 and 1120 shown in FIG. 11 is configured. The first end node may perform communication in the first time slot of the sub-cycle 1110. When it is determined that the communication of the first end node is completed, the second end node may perform communication in the second time slot of the sub-cycle 1110. When it is determined that the communication of the second end node is completed, the third end node may perform communication in the third time slot of the sub-cycle 1110.

When it is determined that communication is completed in the third time slot of the sub-cycle 1110, the end nodes may determine that the sub-cycle ends. That is, the end nodes may determine that the sub-cycle 1120 is started. The first end node may determine that there are two transmission opportunities in the sub-cycle 1120. The second end node may determine that there is one transmission opportunity in the sub-cycle 1120. The third end node may determine that there is no transmission opportunity in the sub-cycle 1120. Accordingly, the third end node may not perform communication in the sub-cycle 1120.

The first end node may perform communication in the first time slot of the sub-cycle 1120. When it is determined that the communication of the first end node is completed, the second end node may perform communication in the second time slot of the sub-cycle 1120. When it is determined that the communication of the second end node is completed, the first end node may perform communication in the third time slot of the sub-cycle 1120.

As such, in the sub-cycle 1120, the end node with the highest PHY ID (i.e., the end node with the PHY ID of 2) may not have a transmission opportunity, and the end node with the lowest PHY ID (i.e., the end node with the PHY ID of 0) may have an additional transmission opportunity. Accordingly, the number (i.e., 3) of end nodes having transmission opportunities in the sub-cycle 1110 may be greater than the number (i.e., 2) of end nodes having transmission opportunities in the sub-cycle 1120. Also, in the sub-cycle 1120, the end node having a PHY ID of 0 may have a plurality of transmission opportunities (i.e., twice).

When the number of end nodes is 3, in the one main-cycle 1100, the transmission opportunities given to the end node having the PHY ID of 0 may be 3 times, and the transmission opportunities given to the end node having the PHY ID of 1 may be 2 times. When it is determined that communication ends in the third time slot of the sub-cycle 1120, the end nodes may determine that the sub-cycle 1120 ends. That is, the end nodes may determine that the main-cycle 1100 ends. In this case, the end nodes may perform a monitoring operation for receiving a beacon, and may receive the beacon through the monitoring operation. The end nodes may perform communication based on configuration information included in the beacon. For example, the end nodes may communicate in the same manner as described above.

Figure 12:
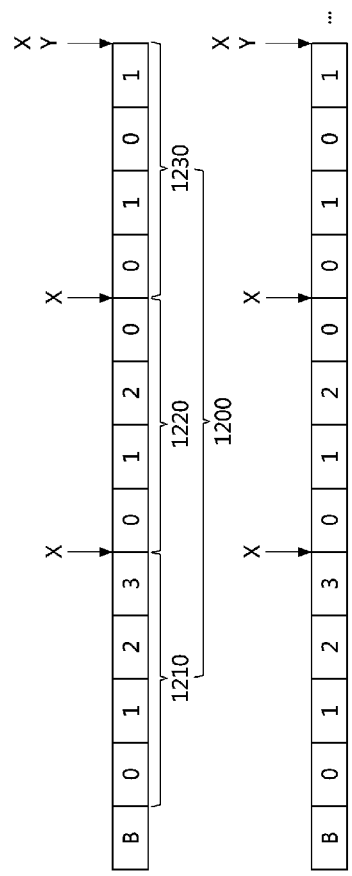

FIG. 12 illustrates transmission cycles when the number of end nodes is 4, that is, the number of PHYs is 4.

As shown in FIG. 12, a main-cycle 1200 starts with transmission of a beacon, and the main-cycle 1200 may include 3 sub-cycles 1210, 1220, and 1230 each of which consists 4 time slots. A total of 12 (=4×(4-1)) transmission opportunities may be granted to end nodes through the main-cycle 1200.

In the sub-cycle 1210, four end nodes having PHY IDs of 0, 1, 2, and 3, respectively, may be granted transmission opportunities in order. For example, a PHY ID of the first end node may be 0, a PHY ID of the second end node may be 1, a PHY ID of the third end node may be 2, and a PHY ID of the fourth end node may be 3. The end nodes may receive the beacon from a master node, and may identify configuration information of the main-cycle, which is included in the beacon. Accordingly, the end nodes may determine that the main-cycle 1200 including the three sub-cycles 1210, 1220, and 1230 shown in FIG. 12 is configured.

The first end node may perform communication in the first time slot of the sub-cycle 1210. When it is determined that the communication of the first end node is completed, the second end node may perform communication in the second time slot of the sub-cycle 1210. When it is determined that the communication of the second end node is completed, the third end node may perform communication in the third time slot of the sub-cycle 1210. When it is determined that the communication of the third end node is completed, the fourth end node may perform communication in the fourth time slot of the sub-cycle 1210. When it is determined that communication is completed in the fourth time slot of the sub-cycle 1210, the end nodes may determine that the sub-cycle 1210 ends. That is, the end nodes may determine that the sub-cycle 1220 is started.

The first end node may determine that there are two transmission opportunities in the sub-cycle 1220. The second end node may determine that there is one transmission opportunity in the sub-cycle 1220. The third end node may determine that there is one transmission opportunity in the sub-cycle 1220. The fourth end node may determine that there is no transmission opportunity in the sub-cycle 1220. Accordingly, the fourth end node may not perform communication in the sub-cycle 1220.

The first end node may perform communication in the first time slot of the sub-cycle 1220. When it is determined that the communication of the first end node is completed, the second end node may perform communication in the second time slot of the sub-cycle 1220. When it is determined that the communication of the second end node is completed, the third end node may perform communication in the third time slot of the sub-cycle 1220.

As such, in the sub-cycle 1220, the end node with the highest PHY ID (i.e., the end node with the PHY ID of 3) may not have a transmission opportunity, and the end node with the lowest PHY ID (i.e., the end node with the PHY ID of 0) may have an additional transmission opportunity. Accordingly, the number (i.e., 4) of end nodes having transmission opportunities in the sub-cycle 1210 may be greater than the number (i.e., 3) of end nodes having transmission opportunities in the sub-cycle 1120. Also, in the sub-cycle 1220, the end node having a PHY ID of 0 may have a plurality of transmission opportunities (i.e., twice).

When it is determined that communication is completed in the fourth time slot of the sub-cycle 1220, the end nodes may determine that the sub-cycle 1220 ends. That is, the end nodes may determine that the sub-cycle 1230 is started. The first end node may determine that there are two transmission opportunities in the sub-cycle 1230. The second end node may determine that there is two transmission opportunities in the sub-cycle 1230. The third end node and the fourth end node may determine that there is no transmission opportunity in the sub-cycle 1230. Accordingly, the third end node and the fourth end node may not perform communication in the sub-cycle 1230.

The first end node may perform communication in the first time slot of the sub-cycle 1230. When it is determined that the communication of the first end node is completed, the second end node may perform communication in the second time slot of the sub-cycle 1230. When it is determined that the communication of the second end node is completed, the first end node may perform communication in the third time slot of the sub-cycle 1230. When it is determined that the communication of the first end node is completed, the second end node may perform communication in the fourth time slot of the sub-cycle 1230.

As such, in the sub-cycle 1230, the end node with the highest PHY ID (i.e., the end node with the PHY ID of 2) may not have a transmission opportunity, and the end node with the lowest PHY ID (i.e., the end node with the PHY ID of 0) may have an additional transmission opportunity. Accordingly, the number (i.e., 3) of end nodes having transmission opportunities in the sub-cycle 1220 may be greater than the number (i.e., 2) of end nodes having transmission opportunities in the sub-cycle 1230. Also, in the sub-cycle 1230, the end node having a PHY ID of 0 and the end node having a PHY ID of 1 may have a plurality of transmission opportunities (i.e., twice), respectively.

When the number of end nodes is 4, in the one main-cycle 1200, the transmission opportunities given to the end node having the PHY ID of 0 may be 5 times, and the transmission opportunities given to the end node having the PHY ID of 1 may be 4 times.

When it is determined that communication ends in the fourth time slot of the sub-cycle 1230, the end nodes may determine that the sub-cycle 1230 ends. That is, the end nodes may determine that the main-cycle 1200 ends. In this case, the end nodes may perform a monitoring operation for receiving a beacon, and may receive the beacon through the monitoring operation. The end nodes may perform communication based on configuration information included in the beacon. For example, the end nodes may communicate in the same manner as described above.

Figure 13:
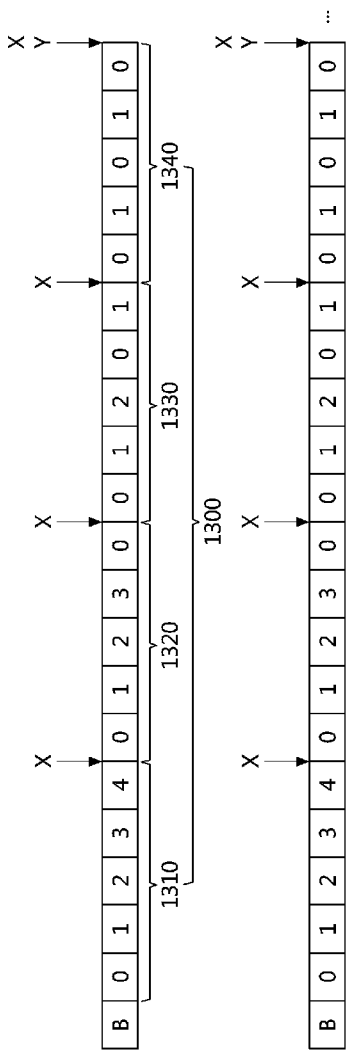

FIG. 13 illustrates transmission cycles when the number of end nodes is 5, that is, the number of PHYs is 5.

As shown in FIG. 13, a main-cycle 1300 starts with transmission of a beacon, and the main-cycle 1300 may include 4 sub-cycles 1310, 1320, 1330, and 1340 each of which consists 5 time slots. A total of 20 (=5×(5-1)) transmission opportunities may be granted to end nodes through the main-cycle 1300.

In the sub-cycle 1310, five end nodes having PHY IDs of 0, 1, 2, 3, and 4, respectively, may be granted transmission opportunities in order. For example, a PHY ID of the first end node may be 0, a PHY ID of the second end node may be 1, a PHY ID of the third end node may be 2, a PHY ID of the fourth end node may be 3, and a PHY ID of the fifth end node may be 4. The end nodes may receive the beacon from a master node, and may identify configuration information of the main-cycle, which is included in the beacon. Accordingly, the end nodes may determine that the main-cycle 1300 including the four sub-cycles 1310, 1320, 1330, and 1340 shown in FIG. 13 is configured.

The first end node may perform communication in the first time slot of the sub-cycle 1310. When it is determined that the communication of the first end node is completed, the second end node may perform communication in the second time slot of the sub-cycle 1310. When it is determined that the communication of the second end node is completed, the third end node may perform communication in the third time slot of the sub-cycle 1310. When it is determined that the communication of the third end node is completed, the fourth end node may perform communication in the fourth time slot of the sub-cycle 1310. When it is determined that the communication of the fourth end node is completed, the fifth end node may perform communication in the fifth time slot of the sub-cycle 1310. When it is determined that communication is completed in the fifth time slot of the sub-cycle 1310, the end nodes may determine that the sub-cycle 1310 ends. That is, the end nodes may determine that the sub-cycle 1320 is started.

The first end node may determine that there are two transmission opportunities in the sub-cycle 1320. The second end node may determine that there is one transmission opportunity in the sub-cycle 1320. The third end node may determine that there is one transmission opportunity in the sub-cycle 1320. The fourth end node may determine that there is one transmission opportunity in the sub-cycle 1320. Also, the fifth end node may determine that there is no transmission opportunity in the sub-cycle 1320. Accordingly, the fifth end node may not perform communication in the sub-cycle 1320.

The first end node may perform communication in the first time slot of the sub-cycle 1320. When it is determined that the communication of the first end node is completed, the second end node may perform communication in the second time slot of the sub-cycle 1320. When it is determined that the communication of the second end node is completed, the third end node may perform communication in the third time slot of the sub-cycle 1320. When it is determined that the communication of the third end node is completed, the fourth end node may perform communication in the fourth time slot of the sub-cycle 1320. When it is determined that the communication of the fourth end node is completed, the first end node may perform communication in the fifth time slot of the sub-cycle 1320.

As such, in the sub-cycle 1320, the end node with the highest PHY ID (i.e., the end node with the PHY ID of 4) may not have a transmission opportunity, and the end node with the lowest PHY ID (i.e., the end node with the PHY ID of 0) may have an additional transmission opportunity. Accordingly, the number (i.e., 5) of end nodes having transmission opportunities in the sub-cycle 1310 may be greater than the number (i.e., 4) of end nodes having transmission opportunities in the sub-cycle 1320. Also, in the sub-cycle 1320, the end node having a PHY ID of 0 may have a plurality of transmission opportunities (i.e., twice). In the sub-cycles 1330 and 1340 after the sub-cycle 1320, the end nodes may have transmission opportunities in the same manner.

When the number of end nodes is 5, in the one main-cycle 1300, the transmission opportunities given to the end node having the PHY ID of 0 may be 8 times, and the transmission opportunities given to the end node having the PHY ID of 1 may be 6 times. When it is determined that communication ends in the fifth time slot of the sub-cycle 1340, the end nodes may determine that the sub-cycle 1340 ends. That is, the end nodes may determine that the main-cycle 1300 ends. In this case, the end nodes may perform a monitoring operation for receiving a beacon, and may receive the beacon through the monitoring operation. The end nodes may perform communication based on configuration information included in the beacon. For example, the end nodes may communicate in the same manner as described above.

FIG. 14 illustrates transmission cycles when the number of end nodes is 6, that is, the number of PHYs is 6.

As shown in FIG. 14, a main-cycle 1400 starts with transmission of a beacon, and the main-cycle 1400 may include 5 sub-cycles 1410, 1420, 1430, 1440, and 1450 each of which consists 6 time slots. A total of 30 (=6×(6-1)) transmission opportunities may be granted to end nodes through the main-cycle 1400.

In the sub-cycle 1410, six end nodes having PHY IDs of 0, 1, 2, 3, 4, and 5, respectively, may be granted transmission opportunities in order. For example, a PHY ID of the first end node may be 0, a PHY ID of the second end node may be 1, a PHY ID of the third end node may be 2, a PHY ID of the fourth end node may be 3, a PHY ID of the fifth end node may be 4, and a PHY ID of the sixth end node may be 5. The end nodes may receive the beacon from a master node, and may identify configuration information of the main-cycle, which is included in the beacon. Accordingly, the end nodes may determine that the main-cycle 1400 including the five sub-cycles 1410, 1420, 1430, 1440, and 1450 shown in FIG. 14 is configured.

The first end node may perform communication in the first time slot of the sub-cycle 1410. When it is determined that the communication of the first end node is completed, the second end node may perform communication in the second time slot of the sub-cycle 1410. When it is determined that the communication of the second end node is completed, the third end node may perform communication in the third time slot of the sub-cycle 1410. When it is determined that the communication of the third end node is completed, the fourth end node may perform communication in the fourth time slot of the sub-cycle 1410. When it is determined that the communication of the fourth end node is completed, the fifth end node may perform communication in the fifth time slot of the sub-cycle 1410. When it is determined that the communication of the fifth end node is completed, the sixth end node may perform communication in the sixth time slot of the sub-cycle 1410. When it is determined that communication is completed in the sixth time slot of the sub-cycle 1410, the end nodes may determine that the sub-cycle 1410 ends. That is, the end nodes may determine that the sub-cycle 1420 is started.

The first end node may determine that there are two transmission opportunities in the sub-cycle 1420. The second end node may determine that there is one transmission opportunity in the sub-cycle 1420. The third end node may determine that there is one transmission opportunity in the sub-cycle 1420. The fourth end node may determine that there is one transmission opportunity in the sub-cycle 1420. The fifth end node may determine that there is one transmission opportunity in the sub-cycle 1420. Also, the sixth end node may determine that there is no transmission opportunity in the sub-cycle 1420. Accordingly, the sixth end node may not perform communication in the sub-cycle 1420.

The first end node may perform communication in the first time slot of the sub-cycle 1420. When it is determined that the communication of the first end node is completed, the second end node may perform communication in the second time slot of the sub-cycle 1420. When it is determined that the communication of the second end node is completed, the third end node may perform communication in the third time slot of the sub-cycle 1420. When it is determined that the communication of the third end node is completed, the fourth end node may perform communication in the fourth time slot of the sub-cycle 1420. When it is determined that the communication of the fourth end node is completed, the fifth end node may perform communication in the fifth time slot of the sub-cycle 1420. When it is determined that the communication of the fifth end node is completed, the first end node may perform communication in the sixth time slot of the sub-cycle 1420.

As such, in the sub-cycle 1420, the end node with the highest PHY ID (i.e., the end node with the PHY ID of 5) may not have a transmission opportunity, and the end node with the lowest PHY ID (i.e., the end node with the PHY ID of 0) may have an additional transmission opportunity. Accordingly, the number (i.e., 6) of end nodes having transmission opportunities in the sub-cycle 4310 may be greater than the number (i.e., 5) of end nodes having transmission opportunities in the sub-cycle 1420. Also, in the sub-cycle 1320, the end node having a PHY ID of 0 may have a plurality of transmission opportunities (i.e., twice). In the sub-cycles 1430, 1440, and 1450 after the sub-cycle 1420, the end nodes may have transmission opportunities in the same manner.

When the number of end nodes is 6, in the one main-cycle 1400, the transmission opportunities given to the end node having the PHY ID of 0 may be 10 times, and the transmission opportunities given to the end node having the PHY ID of 1 may be 9 times. When it is determined that communication ends in the sixth time slot of the sub-cycle 1450, the end nodes may determine that the sub-cycle 1450 ends. That is, the end nodes may determine that the main-cycle 1400 ends. In this case, the end nodes may perform a monitoring operation for receiving a beacon, and may receive the beacon through the monitoring operation. The end nodes may perform communication based on configuration information included in the beacon. For example, the end nodes may communicate in the same manner as described above.

FIGS. 9 to 14 exemplarily illustrate the cases where the number of end nodes is 1, 2, 3, 4, 5, and 6, respectively. However, even when the number of end nodes is N, the end nodes may have transmission opportunities in the same manner. The number of transmission opportunities S of end nodes having PHY IDs of 0 and 1 may be as follows.

When N is 3, the number $S_3$ of transmission opportunities may be as shown in Equation 1 below.

$$S_3 = 5 \times N - 11(+1) = 5 \times N - 10 = 5 \quad \text{[Equation 1]}$$

When N is a natural number equal to or greater than 4, the number $S_N$ of transmission opportunities may be as shown in Equation 2 below.

$$S_N = (5 \times N - 11) \quad \text{[Equation 2]}$$

In conclusion, when N=3, $S_3$=5, and when N≥4, $S_N$=(5×N−11).

On the other hand, when the transmission opportunities are sequentially given to the end nodes as in the prior art, the number of transmission opportunities $S_N$ of the end nodes having PHY IDs 0 and 1 within one main-cycle may be as shown in Equation 3 below. Here, N≥3.

$$S_N = 2 \times (N-1) \quad \text{[Equation 3]}$$

Therefore, when comparing the method according to the present disclosure with the prior art, it can be seen that the transmission opportunities of the end having PHY IDs 0 and 1 are increased by about 2.5 times as shown in Equation 4 below.

$$\lim_{N \to \infty} \frac{(5 \times N) - 11}{2 \times (N-1)} = 2.5 \quad \text{[Equation 4]}$$

The methods according to exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the exemplary embodiments of the present disclosure and their advantages have been described in detail above, it should be understood that various changes, substitutions and alterations may be made herein without departing from the scope of the disclosure.

What is claimed is:

1. An operation method of a first end node constituting an Ethernet-based vehicle network, the operation method comprising:
  receiving a first beacon from a second end node, the beacon including first configuration information of a first main-cycle including a plurality of sub-cycles each of which includes N time slots;
  transmitting a signal in a time slot corresponding to an identifier of the first end node among the N time slots within a sub-cycle #k of the plurality of sub-cycles; and
  transmitting a signal in a time slot corresponding to the identifier of the first end node among the N time slots in a sub-cycle #(k+1) consecutive with the sub-cycle #k of the plurality of sub-cycles,
  wherein a number of end nodes having transmission opportunity in the sub-cycle #k is greater than a number of end nodes having transmission opportunity in the sub-cycle #(k+1), N is a natural number equal to or greater than 2, and K is a natural number equal to or greater than 1.

2. The operation method according to claim 1, wherein the end node having a plurality of transmission opportunities is an end node having a high transmission priority.

3. The operation method according to claim 2, wherein the first beacon includes identifiers of end nodes performing signal transmission in the N time slots, and a transmission priority of each of the end nodes is determined according to the identifier of the each of the end nodes.

4. The operation method according to claim 1, wherein the first beacon further includes information indicating a maximum length of the time slot, and the signal is transmitted within the maximum length indicated by the first beacon.

5. The operation method according to claim 1, wherein the first beacon further includes information indicating a period for which the first configuration information of the first main-cycle is valid, and the period corresponds to one or more beacon intervals.

6. The operation method according to claim 1, further comprising, when the first main-cycle ends, receiving a second beacon from the second end node, the second beacon including second configuration information of a second main-cycle including a plurality of sub-cycles each of which includes M time slots, wherein M is a natural number different from N.

7. The operation method according to claim 1, wherein each of one or more end nodes has a plurality of transmission opportunities in the sub-cycle #(k+1).

8. The operation method according to claim 1, wherein, when a time slot configured for the first end node is not present in the N time slots in a sub-cycle #(k+2) consecutive with the sub-cycle #(k+1) among the plurality of sub-cycles, the first end node does not transmit a signal in the sub-cycle #(k+2).

9. An operation method of a second end node constituting an Ethernet-based vehicle network, the operation method comprising:
  generating first configuration information of a first main-cycle including a plurality of sub-cycles each of which includes N time slots;
  transmitting a first beacon including the first configuration information of the first main-cycle; and receiving a signal from one or more end nodes in the N time slots included in each of the plurality of sub-cycles, wherein a number of end nodes having transmission opportunity in a sub-cycle #k is greater than a number of end nodes having transmission opportunity in a sub-cycle #(k+1), N is a natural number equal to or greater than 2, and K is a natural number equal to or greater than 1.

10. The operation method according to claim 9, wherein the first beacon further includes information indicating a maximum length of the time slot, and the signal is transmitted within the maximum length indicated by the first beacon.

11. The operation method according to claim 9, wherein the first beacon further includes information indicating a period for which the first configuration information of the first main-cycle is valid, and the period corresponds to one or more beacon intervals.

12. The operation method according to claim 9, further comprising:

when the first main-cycle ends, generating a second beacon including second configuration information of a second main-cycle including a plurality of sub-cycles each of which includes M time slots; and transmitting the second beacon including the second configuration information of the second main-cycle, wherein M is a natural number different from N.

13. A first end node constituting an Ethernet-based vehicle network, the first end node comprising:

a physical (PHY) layer unit including a PHY layer processor;

a controller unit including a controller processor; and a memory storing at least one instruction executable by the PHY layer unit and the controller unit, wherein when executed by the PHY layer unit and the controller unit, the at least one instruction is configured the PHY layer unit and the controller unit to:

receive a first beacon from a second end node, the beacon including first configuration information of a first main-cycle including a plurality of sub-cycles each of which includes N time slots;

transmit a signal in a time slot corresponding to an identifier of the first end node among the N time slots within a sub-cycle #k of the plurality of sub-cycles; and transmit a signal in a time slot corresponding to the identifier of the first end node among the N time slots in a sub-cycle #(k+1) consecutive with the sub-cycle #k of the plurality of sub-cycles, wherein a number of end nodes having transmission opportunity in the sub-cycle #k is greater than a number of end nodes having transmission opportunity in the sub-cycle #(k+1), N is a natural number equal to or greater than 2, and K is a natural number equal to or greater than 1.

14. The first end node according to claim 13, wherein the end node having a plurality of transmission opportunities is an end node having a high transmission priority.

15. The first end node according to claim 14, wherein the first beacon includes identifiers of end nodes performing signal transmission in the N time slots, and a transmission priority of each of the end nodes is determined according to the identifier of the each of the end nodes.

16. The first end node according to claim 13, wherein the first beacon further includes information indicating a maximum length of the time slot, and the signal is transmitted within the maximum length indicated by the first beacon.

17. The first end node according to claim 13, wherein the first beacon further includes information indicating a period for which the first configuration information of the first main-cycle is valid, and the period corresponds to one or more beacon intervals.

18. The first end node according to claim 13, wherein the at least one instruction is further configured the PHY layer unit and the controller unit to, when the first main-cycle ends, receive a second beacon from the second end node, the second beacon including second configuration information of a second main-cycle including a plurality of sub-cycles each of which includes M time slots, wherein M is a natural number different from N.

19. The first end node according to claim 13, wherein each of one or more end nodes has a plurality of transmission opportunities in the sub-cycle #(k+1).

20. The first end node according to claim 13, wherein, when a time slot configured for the first end node is not present in the N time slots in a sub-cycle #(k+2) consecutive with the sub-cycle #(k+1) among the plurality of sub-cycles, the first end node does not transmit a signal in the sub-cycle #(k+2).

* * * * *